United States Patent [19]

Asberg

[11] Patent Number: 5,037,254
[45] Date of Patent: Aug. 6, 1991

[54] TOOL CLAMPING DEVICE

[75] Inventor: Lars-Gunnar Asberg, Järbo, Sweden

[73] Assignee: Sandvik AB, Sandviken, Sweden

[21] Appl. No.: 466,765

[22] Filed: Jan. 18, 1990

[30] Foreign Application Priority Data

Feb. 1, 1989 [SE] Sweden ................................ 8900342

[51] Int. Cl.⁵ ...................... B23B 31/171; B23Q 3/12
[52] U.S. Cl. .................................. 409/233; 279/1 B;
  279/46 R; 279/50; 279/57; 279/89
[58] Field of Search ............................... 409/232-234;
  279/50, 1 B, 57, 74, 75, 82, 89-91, 46 R, 1 TS;
  403/322; 408/238, 239 R, 239 A

[56] References Cited
U.S. PATENT DOCUMENTS 3,043,614  7/1962  Eichmann ........................... 279/75
3,168,322  2/1965  Dziedzic .......................... 279/50 X
4,172,683  10/1979 Shimajiri et al. ................ 408/239 A
4,604,012  8/1986  Kawasaki et al. .................. 409/233
4,632,614  12/1986 Rall et al. ......................... 409/233
4,773,800  9/1988  Furuhashi et al. ............. 279/1 TS X Primary Examiner—Steven C. Bishop
Attorney, Agent, or Firm—Burns, Doane, Swecker & Mathis

[57] ABSTRACT

A tool clamping device comprises an axial sleeve having a forwardly tapering internal surface. A radially compressible ring is disposed on the internal surface. An axially compressible spring opposes axial movement of the ring while permitting axial rearward movement of the sleeve whereby the tapering surface of the sleeve compresses the ring radially inwardly into coupling engagement with a groove formed in a tool holder.

26 Claims, 2 Drawing Sheets 4,037,254

TOOL CLAMPING DEVICE

BACKGROUND AND OBJECTS OF THE INVENTION

The present invention relates to a clamping device for machine tools comprising a draw bar that is axially reciprocable inside the machine spindle and arranged to support a conical tool arbor by means of a releasably and coaxially clamped sleeve.

There is an increased demand for tool clamping devices that are reliable in tooling machines. Usually the tool is carried by a conical portion which functions to centralize the tool in the spindle and to absorb the radial and axial forces that are acting on the tool. There is also an increased demand for devices that enable tool changes to be made automatically in tooling machines.

It is a purpose of the present invention to provide a tool clamping device that provides for a transmission of much larger tensile forces than what is possible with other commercially available devices.

It is another purpose of the invention to provide a tool clamping device which requires less space than those hitherto available.

It is another purpose of the invention to provide such a clamping device that involves only a short axial displacement of the clamping sleeve in connection with change of tools.

It is yet another purpose of the invention to provide a clamping device that comprises few components thus enabling simplified construction of the device.

BRIEF DESCRIPTION OF THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
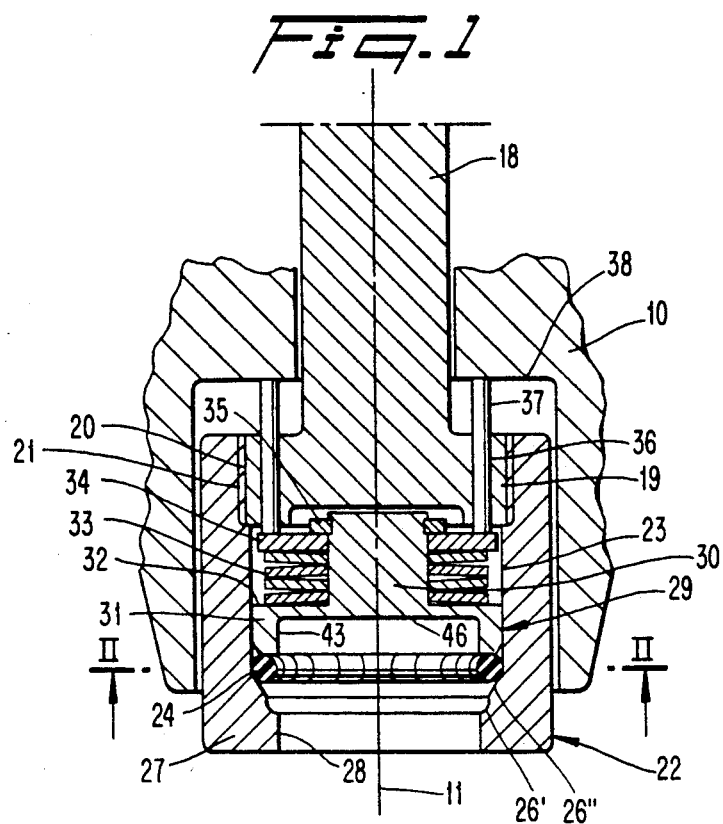
FIG. 1 shows a longitudinal section of a tool machine spindle and a clamping device provided therein.

In the Figures there is illustrated a tool machine spindle 10. The spindle is operated in a conventional manner and therefore the detailed structure thereof is not illustrated. A conical arbor 12 which is symmetrical around a central axis 11 has been received in a correspondingly conically designed recess 13 in the machine spindle 10. The conical arbor 12 is intended to carry a tool (not shown) at a forward end portion at which there is also provided a carrying flange 14. In its rear end portion the arbor is provided with a threaded bore 15 in which a draw tap 17 having external threads 16 is intended to be threadably engaged. Alteratively, the front end of the draw tap 17 could be made integral with the conical arbor 12 or it could be releasably connected with the arbor with some other type of clamping means.

A clamping device which carries the tool and conical arbor is provided inside the machine spindle, the clamping device comprising a draw bar 18, which is displaceable axially forwardly and rearwardly. The axial direction could be vertical, horizontal, or a combination of both. The front end of the draw bar carries a radial flange portion 19 which is provided with an external thread 20 to be threadably connected with a corresponding internally threaded portion 21 of a clamping sleeve 22. The clamping sleeve 22 is arranged coaxially in relation to the draw bar, with an elastic locking ring 24 being received in an interior recess 23 of the sleeve. The locking ring 24 has in its released position an exterior diameter corresponding with the diameter of the recess 23.

The conical arbor 12 is carried by the draw tap 17 which, in turn, is carried in the clamping sleeve 22 by arranging the locking ring 24 such that it is partially received in annular recess 25 on the draw tap while being in supporting abutment with an abutment surface 26'. The latter is provided by narrowing the entrance bore of the sleeve by means of a radially inwards extending flange portion 27. This abutment surface 26' is provided as the front end portion of an inclined transition surface 26" extending between the central hole 23 of the sleeve and the axially extending, radially inwardly facing inner surface 28 of the flange portion 27.

It is important that the abutment surface 26' have a smoothly rounded profile which as closely as possible corresponds with the profile of the locking ring 24. This provides a sufficiently large contact surface which reduces the surface pressure. It is desirable that the material of the abutment surface 26', i.e., the material of the metal segments 39 of the clamping ring (to be discussed below) and the material of the annular recess 25 of the draw tap be made of hardened material which facilitates maintenance of desired dimensional limitations of the device.

A supporting element 29 is also received in the hole of the sleeve 22 consisting of a central neck portion 30 and a lower radially enlarged portion 31 so that a radial stop 32 is obtained against which a number of spring washers 33 are resting. The front end surface of the supporting element 29 is intended to abut against the locking ring 24.

In a rear direction, the spring washers 33 are supported against a radially extending washer 34 which is located around the neck portion 30 and secured against axial displacement by means of an annular snap ring 35 or similar device.

The supporting element 29 has the function of being an abutment for the locking ring 24 during the engagement phase. Thus, the element 29 shall apply a forwardly directed resisting force which is larger than the rearward axial force imposed on the locking ring (by friction and impact of the conical angle of surface 26) when the clamping sleeve is displaced backwards. Hence, the supporting element 29 must be supported axially which is accomplished by providing a number of pins 37 received in a bore 36 extending through the flange portion 19. The pins act through the washer 34 and the biased spring washers 33 to keep the supporting element in position in relation to the spindle 10.

Figure 2:
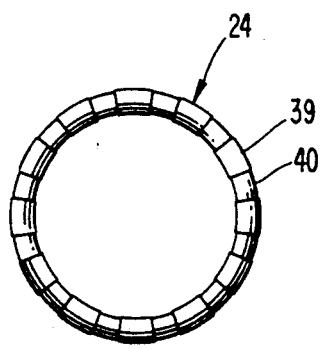
FIG. 2 shows a plan view along the line II—II in FIG. 1 of a clamp ring which comprises one part of the clamping device.
Figure 3:
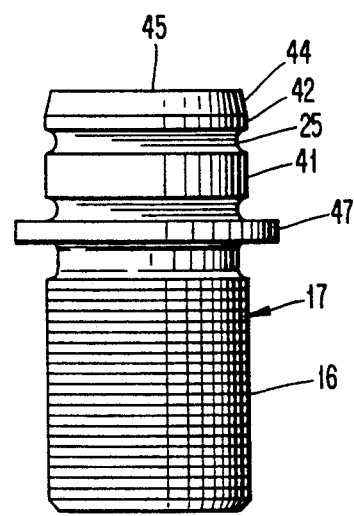
FIG. 3 is a side view of a draw bar which comprises part of the clamping device.

The locking ring 24 is provided for the purpose of gripping the draw tap 17 and thus securing the tool arbor 12 connected therewith. This locking ring 24 is preferably in the shape of an O-ring composed of a number of spaced metal segments 39 which are kept together in O-ring fashion by vulcanized rubber segments 40 in the manner shown in FIG. 2. This gives the ring 24 the ability to be compressed radially while exhibiting sufficiently good carrying ability to axially carry the tool arbor 12 via the draw tap 17.

The draw tap 17 is provided with an annular recess 25 for the receipt of the locking ring 24 on both sides of which axially extending guide surfaces 41 and 42 are provided. The axially forward or lower guide surface 41 is intended to slide relative to the inner surface 28 of clamping sleeve 22 with a clearance fit whereas the upper guide surface 42 is similarly intended to slide relative to the interior axial surface 28 of the clamping sleeve during the assembling phase. The draw tap 17 is additionally provided with an entering beveled portion 44 the axial extent of which is selected so that at the completion of the clamping of the tool arbor 12 by means of the draw bar 18, the rear end surface 45 of the draw tap 17 which extends perpendicularly to the central axis 11 is brought into abutment with a centrally located end surface 46 of the supporting element 29. It is found to be suitable to make the depth of the recess 25 in the draw tap 17 essentially equal with or somewhat less than one-half of the cross-sectional diameter of the locking ring 24. Further, both guide surfaces 41 and 42 of the draw tap 17 ought to be coaxial and of the same diameter in order to facilitate the entrance and assembly of the draw tap into the clamping sleeve 22. In order to be capable of clearly defining the axial position of the draw tap in relation to the conical arbor 12, the draw tap 17 is provided with a radial flange 47 located between the rear termination of threaded portion 16 and the guide surface 41, whereby the flange is arranged to abut against the end surface 48 of the arbor 12 which is facing the machine spindle. In the embodiment shown, the draw bar 18 is arranged axially behind the package of spring washers 33.

Figure 4:
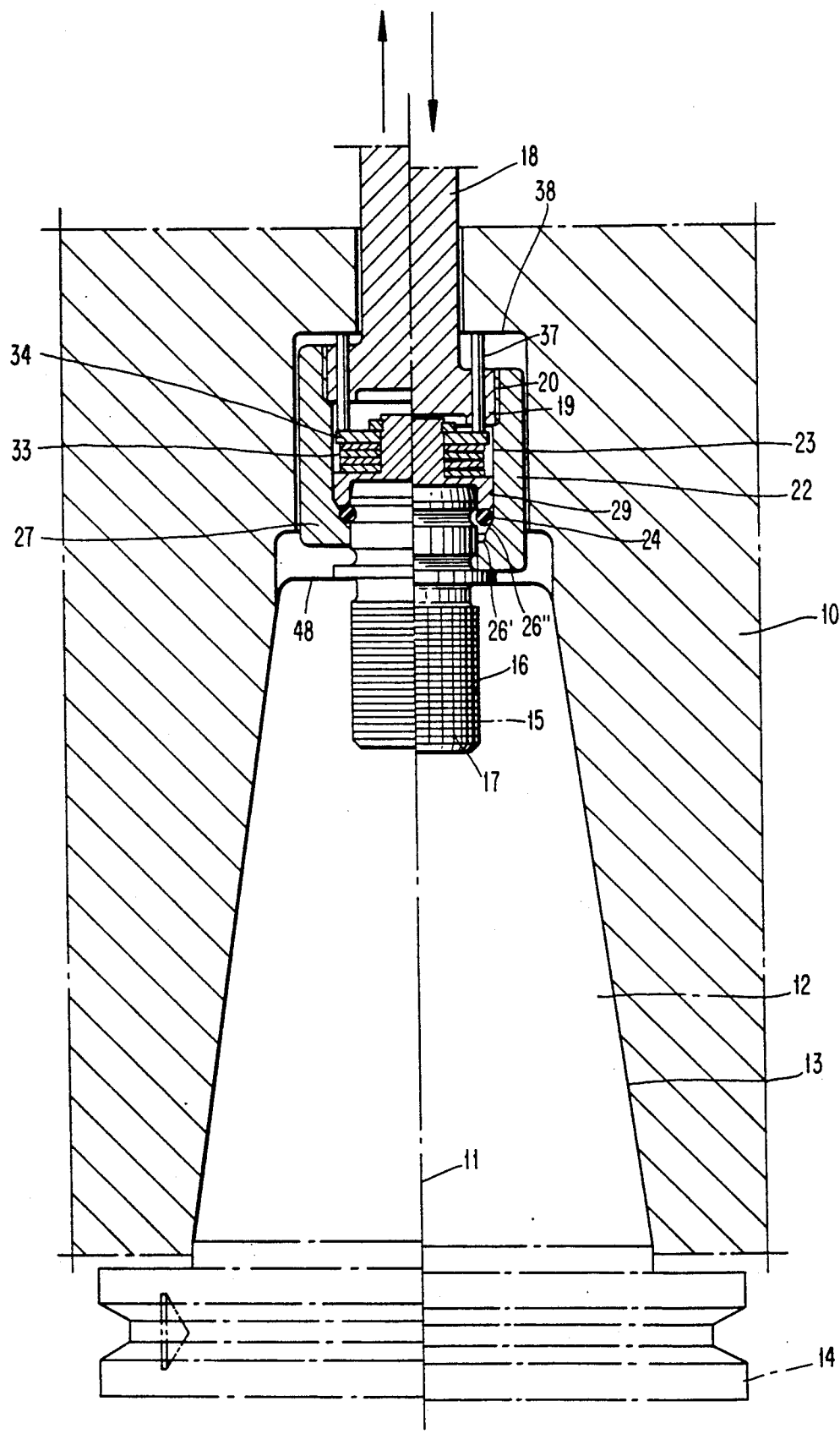
FIG. 4 shows, to the left of the center line, the device in its clamped position and to the right of the center line, the device in its released position.

The release movement is accomplished by a suitable press force effected on the draw bar 18 sufficient to press the draw bar 18 and the clamping sleeve 22 rigidly connected therewith axially forwardly, thereby enabling the locking ring 24 to expand radially, due to the inclination of transition surface 26", and adopt the position depicted at the right of central axis 11 in FIG. 4. Hence, the locking ring 24 has been given the ability to slide along transition surface 26" and by its natural expansion adopt a position in which it is laterally disengaged from annular recess 25 of the draw tap 17 thus enabling the latter to become axially released to provide for a change of tool.

When a new tool arbor 12 is to be mounted in the spindle 10 the axial displacement of the draw bar 18 is effected backwards. The locking ring 24 is thus subjected to radial compression as it slides along the transition surface 26" and adopts its locking position against the abutment surface 26' as is shown to the left of the central axis in FIG. 4. When a large tensile force is built up in the draw bar 18, the arbor is then displaced rearwardly by an additional small distance to its fixed position in the conical bore 13 in the spindle 10. This short distance of displacement of the bar 18 also produces axial rearward displacement of the supporting element 29 in relation to the spindle 10. This additional axial displacement of the supporting element is absorbed by the package of spring washers 33 which is compressed to the position shown to the left of the central axis in FIG. 4.

The clamping device has been described herein as useful in a tool clamping system for rotary tools. The invention is, however, also useful for connecting stationary turning tools with a tooling machine as well as in connection with other types of tool holders than traditional arbors.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A clamping device for clamping a tool arbor to a machine spindle, comprising a draw bar reciprocable along a front-to-rear longitudinal axis within said machine spindle, a sleeve mounted at a forward end of said draw bar for being releasably connected to a draw tap carried by a tool arbor, said sleeve including an internal surface, an annular locking ring mounted in said sleeve against said internal surface, said sleeve being movable rearwardly relative to said locking ring to urge said locking ring laterally inwardly into locking engagement with a recess formed in said draw tap, and to simultaneously urge said locking ring rearwardly for clamping the tool arbor rearwardly against said machine spindle.

2. A clamping device according to claim 1, wherein said draw tap is threadedly connected to said tool arbor.

3. A clamping device according to claim 1, wherein said locking ring is in the form of an O-ring comprising a plurality of elastomeric segments interconnected by metal segments, said elastomeric segments formed of an elastomeric material.

4. A clamping device according to claim 1 including opposing means opposing rearward movement of said locking ring during relative rearward movement of said sleeve.

5. A clamping device according to claim 4, wherein said opposing means includes spring means disposed within said sleeve behind said locking ring.

6. A clamping device according to claim 5 including support means extending through said sleeve and abutting a wall of said machine spindle for supporting a rear end of said spring means.

7. A clamping device according to claim 6, wherein said support means comprises a plurality of pins.

8. A clamping device according to claim 5, wherein said spring means comprises a stack of spring washers.

9. A clamping device according to claim 8 including a supporting element disposed within said sleeve between said washer means and said locking ring.

10. A clamping device according to claim 9, wherein said supporting element comprises a central neck extending through said washers, and a flange portion having a rearwardly facing stop surface against which said washers act, a portion of said supporting element extending forwardly from said stop surface and terminating in a forward end surface engaging said locking ring.

11. A clamping device according to claim 1, wherein said internal surface includes a transition surface portion which is inclined so as to become narrower in the forward direction whereby said transition surface portion compresses said locking ring laterally inwardly in response to rearward movement of said sleeve relative to said locking ring.

12. A clamping device according to claim 11, wherein said internal surface includes an abutment surface at a forward end of said transition surface and configured as a groove with a rounded profile shaped complementary to said recess in said draw tap.

13. A clamping device according to claim 12, wherein said recess has a lateral depth substantially equal to one-half of the diameter of said locking ring.

14. A clamping device according to claim 1, wherein a forward end of said sleeve includes a laterally inwardly projecting flange portion, a radially inner surface thereof configured to slidably guide said draw tap, said internal surface extending rearwardly from said radially inner surface.

15. A clamping device according to claim 1, wherein said draw tap includes cylindrical guide surfaces disposed forwardly and rearwardly, respectively, relative to said recess.

16. A clamping device according to claim 9, wherein said supporting element includes a forwardly facing surface against which a rearward end of said draw tap abuts when said draw tap is secured by said locking ring.

17. A clamping device according to claim 1, wherein said internal surface is of corresponding shape to a peripheral surface of said locking ring which engages said internal surface, as said peripheral and internal surfaces are viewed in longitudinal section.

18. A clamping device according to claim 17, wherein said shape is curved as said peripheral and internal surfaces are viewed in longitudinal section.

19. A clamping device according to claim 18, wherein said curved shape is that of a segment of a circle.

20. A clamping device for clamping a draw tap, comprising:
a machine spindle,
a sleeve axially forwardly and rearwardly reciprocable in said machine spindle and including an annular internal surface which includes a forwardly tapering portion terminating in a forwardly facing opening,
a compressible annular locking ring disposed against said internal surface,
said sleeve being rearwardly movable relative to said locking ring, and
opposing means for opposing rearward movement of said locking ring during relative rearward movement of said sleeve, whereby said tapering portion of said internal surface compresses said locking ring radially inwardly into coupling engagement with a portion of a tool holder.

21. A clamping device according to claim 20, wherein said opposing means comprises an axially compressible spring.

22. A clamping device for clamping a tool arbor to a machine spindle, comprising a draw bar reciprocable within said machine spindle, a sleeve mounted at a forward end of said draw bar for being releasably connected to a draw tap carried by a tool arbor, said sleeve including an internal surface, an annular locking ring mounted in said sleeve against said internal surface, said sleeve being movable rearwardly relative to said locking ring to urge said locking ring laterally inwardly into locking engagement with a recess formed in said draw tap, and opposing means opposing rearward movement of said locking ring during relative rearward movement of said sleeve.

23. A clamping device according to claim 22, wherein said opposing means includes spring means disposed within said sleeve behind said locking ring.

24. A clamping device for clamping a tool arbor to a machine spindle, comprising a draw bar reciprocable within said machine spindle, a sleeve mounted at a forward end of said draw bar for being releasably connected to a draw tap carried by a tool arbor, said sleeve including an internal surface, an annular locking ring mounted in said sleeve against said internal surface, said sleeve being movable rearwardly relative to said locking ring to urge said locking ring laterally inwardly into locking engagement with a recess formed in said draw tap, said internal surface including a transition surface portion which is inclined so as to become narrower in the forward direction whereby said transition surface portion compresses said locking ring laterally inwardly in response to rearward movement of said sleeve relative to said locking ring.

25. A clamping device according to claim 24, wherein said internal surface includes an abutment surface at a forward end of said transition surface, said abutment surface configured as a groove with a rounded profile shaped complementary to said recess in said draw tap.

26. A clamping device for clamping a tool arbor to a machine spindle, comprising a draw bar reciprocable within said machine spindle, a sleeve mounted at a forward end of said draw bar for being releasably connected to a draw tap carried by a tool arbor, said sleeve including an internal surface, an annular locking ring mounted in said sleeve against said internal surface, said sleeve being movable rearwardly relative to said locking ring to urge said locking ring laterally inwardly into locking engagement with a recess formed in said draw tap, said draw tap including cylindrical guide surfaces disposed forwardly and rearwardly, respectively, relative to said recess.

* * * * *